(12) United States Patent
Sunwoo et al.

(10) Patent No.: US 6,192,160 B1
(45) Date of Patent: *Feb. 20, 2001

(54) HARDWARE ARCHITECTURES FOR IMAGE DILATION AND EROSION OPERATIONS

(75) Inventors: Myung Hoon Sunwoo, Suwon; Soohwan Ong, Chungeub; Eul-suk Lee, Seoul; Tae-Young Choi, Suwon, all of (KR)

(73) Assignee: Hyundai Microelectronics Co., Ltd., Chungcheongbuk-do (KR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/932,132

(22) Filed: Sep. 18, 1997

Related U.S. Application Data

(60) Provisional application No. 60/026,365, filed on Sep. 19, 1996.

(51) Int. Cl.[7] .......................................................... G06K 9/42
(52) U.S. Cl. ............................................ 382/257; 382/308
(58) Field of Search ..................................... 382/257, 308

(56) References Cited

U.S. PATENT DOCUMENTS

| | | | |
|---|---|---|---|
| 4,414,685 | * 11/1983 | Sternberg ............................ | 382/257 |
| 4,641,356 | * 2/1987 | Sternberg ............................ | 382/257 |
| 4,760,607 | * 7/1988 | Sternberg et al. .................... | 382/257 |
| 4,866,785 | * 9/1989 | Shibano ............................... | 382/257 |
| 5,129,014 | * 7/1992 | Bloomberg .......................... | 382/308 |
| 5,201,011 | * 4/1993 | Bloomberg et al. ................. | 382/308 |
| 5,577,131 | * 11/1996 | Oddou ................................ | 382/308 |
| 5,680,485 | * 10/1997 | Loce et al. .......................... | 382/308 |

OTHER PUBLICATIONS

A Digit–Serial Architecture for Gray–Scale Morphological Filtering, Lori Lucke et al, IEEE Transactions on Image Processing, vol. 4, No. 3, Mar. 1995.*

Threshold Decomposition of Gray–Scale Morphology into Binary Morphology, Frank Yeong–Chyang Shih et al., IEEE Transactions on Pattern Analysis and Machine Intelligence, vol. 2 No. 1, Jan. 1989.*

* cited by examiner

Primary Examiner—Leo H. Boudreau
Assistant Examiner—Gregory Desiré
(74) Attorney, Agent, or Firm—Morgan & Finnegan, LLP

(57) ABSTRACT

A hardware architecture for mathematical morphology operations such as dilation and erosion of an image signal is provided. A hardware architecture for an image dilation operation includes: a plurality of adders corresponding to the size of the structuring element for adding the image signal and a structuring element symmetrical to the image signal with respect to the origin to output the result; a plurality of stores for temporarily storing the signals output from the plural adders; a comparator for comparing data stored in the plural stores with feedback data to output the maximum data; and an outputting device for outputting the output signal of the comparator as a dilation operation value if the dilation operation with respect to all structuring elements for one image signal is completed and feeding back the output signal of the comparator as input data of the comparator if not. Therefore, the elementary operations such as dilation and erosion with respect to a gray-level image signal can be attained by a simple arithmetic operation, that is, by finding the maximum/minimum value using an adder. Also, since the hardware architecture for the dilation and erosion operations adopts a feedback structure, the volume of the hardware linearly increases even though the size of the structuring element increases in geometrical progression.

7 Claims, 6 Drawing Sheets

US 6,192,160 B1

HARDWARE ARCHITECTURES FOR IMAGE DILATION AND EROSION OPERATIONS

This application claims benefit of Provisional application Ser. No. 60/026,365, filed Sep. 19, 1996.

BACKGROUND OF THE INVENTION

The present invention relates to hardware architectures for mathematical morphology operators, and more particularly, to hardware architectures for mathematical morphology operations such as image dilation or erosion, which can increase operation speed while decreasing the volume of hardware.

A mathematical morphology having a nonlinear characteristic is very effective in noise elimination, and pattern and edge preservation of signals. Thus, the mathematical morphology has been applied to an image signal processing field such as image dividing or defect detection. A linear system distorts the structure and morphology of the image when processing an image signal. Here, in order to solve this problem, a non-linear filter adopting the mathematical morphology has been mainly used. As elementary operators of the mathematical morphology, there are dilation and erosion. Also, there is a filter using opening, closing, opening-closing, and closing-opening operations by combining the dilation and erosion operators. Here, the opening and closing operations can be performed by repeating the erosion and dilation operations.

While the mathematical morphology having the excellent non-linear characteristic has been widely applied to an image signal processing area, a real-time processing cannot be performed using a software method due to an excessive amount of operations required therefor. Thus, research for solving the problem has been widely performed in aspects of hardware. Current structures of very large-scale integrated circuit (VLSI) related to the basic operation of the mathematical morphology are classified into two as follows.

First, there is a method for operating a gray-level image into a binary image, which is disclosed in an article entitled "Threshold Decomposition of Gray-Scale Morphology into Binary Morphology" written by F. Y. Shih and O. R. Miychell (IEEE Trans. on Pattern Analysis and Machine Intelligence, Vol. II, No. 1, January 1989). According to the article, a threshold decomposition is used for the image binarization, wherein a maximum value of a structuring element is fixed, thereby decreasing the volume of the hardware. However, the operation is impossible if the value of the structuring element is changed. Also, while the operation speed is fast since the operation is performed by a simple logic operation, the number of operations for the image binarization is increased.

Second, there is a method for performing an operation by finding maximum and minimum values of a gray-level image using an adder, which is disclosed in an article entitled "A Digital-serial Architecture for Gray-Scale morphological Filtering" written by L. Lucke and C. Chakrabarti (IEEE Trans. on Image processing, Vol. 4, No. 3, March 1995). According to the method, the volume of the hardware is small while the operation speed is slow. Also, there is a disadvantage of an increase in geometric progression of the hardware's volume according to the increase of the window's size of a structuring element.

FIG. 7 is a block diagram showing the structure of a conventional hardware architecture for dilation operation of an image signal, which is a 3×3 VSLI structure in which respective unit hardware is connected each other.

In unit hardware structures 71, 72 and 63, after adding a structuring element $S_{mn}$ to an original image $I_{ij}$, the result is input to a comparator which compares the result with a result obtained by a neighboring pixel. As a result, a larger value between two compared results is selectively output. Also, the maximum value of the outputs from each unit hardware is selected by comparators 74 and 75 and the result is then output via an output register 76.

In the dilation operation, locations of the original image and the structuring element are symmetrical with respect to the origin. A total of four steps of comparison should be performed with respect to all 3×3 images. One adder is required for each pixel, and a total of eight comparators are required. The structuring element slides and operates with the original image during a window operation, so that there is no need for additionally storing an intermediate value of the operation. Thus, a total of nineteen registers are required, including nine for buffering an input image, nine for storing the values of structuring elements and one for synchronizing an output as an output buffer. The number of dilation operations is a total of five including one addition operation and four comparison operations.

FIG. 8 is a block diagram showing the structure of a conventional hardware architecture for erosion operation of an image signal, which is a 3×3 VLSI structure in which respective unit hardware is connected each other.

In unit hardware structures 81, 82 and 83, after subtracting a structuring element $S_{mn}$ from an original image $I_{ij}$, the result is input to a comparator which compares the result with a result obtained by a neighboring pixel. As a result, a smaller value between two compared results is selectively output. Also, the minimum value of the outputs from each unit hardware is selected by comparators 84 and 85 and the result is then output via an output register 86.

The erosion operation is same as the dilation operation, except that the minimum value is found within the size of the structuring element after subtracting the value of the structuring element from that of the original image and the location of the structuring element is not symmetrical with respect to the origin. Comparing the basic structures of the unit hardware shown in FIGS. 7 and 8, the unit hardware of FIG. 8 includes a subtractor instead of an adder and the comparators of FIG. 8 select and output the minimum value between two values input to the comparators.

However, according to the conventional hardware architectures for the dilation and erosion operations, shown in FIGS. 7 and 8, the volume of the hardware is increased in geometric progression as the window's size of the structuring element increases.

SUMMARY OF THE INVENTION

It is an object of the present invention to provide hardware architectures for a dilation operation of an image signal, which decrease the volume of hardware and increase an operation speed.

It is another object of the present invention to provide hardware architectures for an erosion operation of an image signal, which decrease the volume of hardware and increase an operation speed.

It is still another object of the present invention to provide hardware architectures for dilation and erosion operations of an image signal, which decrease the volume of hardware and increase an operation speed.

To achieve the first object of the present invention, there is provided hardware architectures for a dilation operation of an image signal in accordance to structuring elements with a respectively predetermined size, comprising: a plurality of adding means corresponding to the size of the structuring element for adding the image signal and a structuring element symmetrical to the image signal with respect to the origin to output the result; a plurality of storing means for temporarily storing the signals output from the plural adding means; comparing means for comparing data stored in the plural storing means with feedback data to output the maximum data; and outputting means for outputting the output signal of the comparing means as a dilation operation value if the dilation operation with respect to all structuring elements for one image signal is completed and feeding back the output signal of the comparing means as input data of the comparing means if not.

To achieve the second object of the present invention, there is provided hardware architectures for an erosion operation of an image signal in accordance to structuring elements with a respectively predetermined size, comprising: a plurality of subtracting means corresponding to the size of the structuring element, for subtracting a structuring element corresponding to the image signal from the image signal to output the result; a plurality of storing means for temporarily storing the signals output from the plural subtracting means; comparing means for comparing data stored in the plural storing means with feedback data to output the minimum data; and outputting means for outputting the output signal of the comparing means as an erosion operation value if the erosion operation with respect to all the structuring elements for one image signal is completed and feeding back the output signal of the comparing means as input data of the comparing means if not.

To achieve the third object of the present invention, there is provided hardware architectures for dilation and erosion operations of an image signal in accordance to structuring elements with a respectively predetermined size, comprising: control signal generating means for generating a control signal determining whether to perform either dilation or erasion operation with respect to the image signal; a plurality of adding or subtracting means corresponding to the size of the structuring element for adding a structuring element symmetrical to the image signal with respect to the origin to the image signal or subtracting a structuring element corresponding to the image signal from the image signal to output the result; a plurality of storing means for temporarily storing the signals output from the plural adding or subtracting means; comparing means for comparing data stored in the plural storing means with feedback data to output the maximum data or the minimum data; and outputting means for outputting the output signal of the comparing means if the dilation operation with respect to all the structuring elements for one image signal is completed and feeding back the output signal of the comparing means as input data of the comparing means if not.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
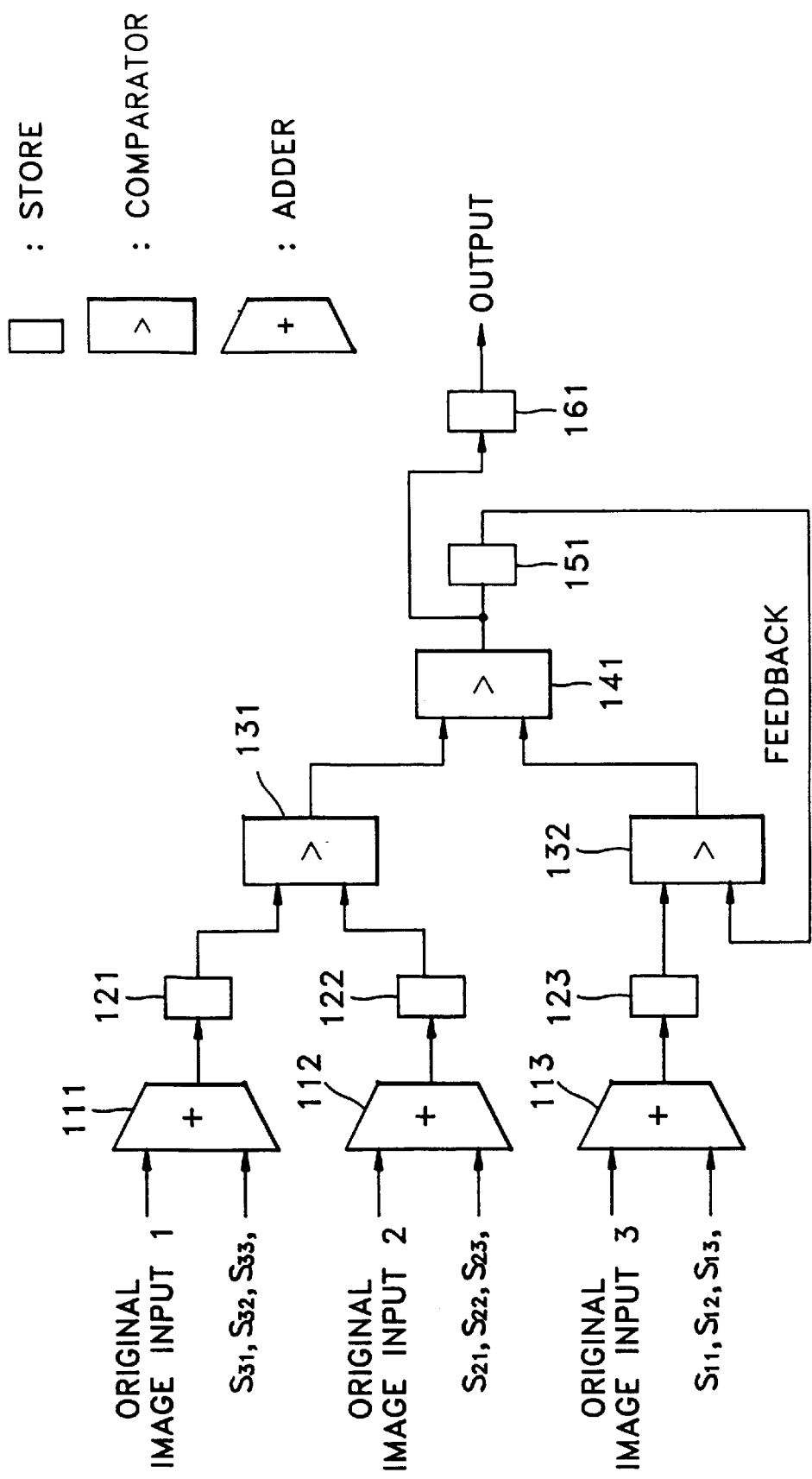
FIG. 1 is a block diagram showing the structure of a hardware architecture for a dilation operation for a 3×3 structuring element according to the present invention.

First, the definition and concept of the elementary operations in mathematical morphology will be described in detail.

If a dilation operation is performed with respect to an image, a light portion of an original image expands and a dark portion thereof contracts to brighten the whole image. The degrees of expansion and brightness can be seen according to the size and value of a small operator called a structuring element. Let f and b denote the original image and the structuring element, respectively. The definition of the one-dimensional dilation thereto can be expressed as the following formula (1).

$$(f \oplus b)(s) = \max\{f(s-x)+b(x)|(s-x) \epsilon D_f \text{ and } x \epsilon D_b\} \quad (1)$$

A sign $\oplus$ represents the dilation operation and $D_f$ and $D_b$ represent the domains of the original image and the structuring element, respectively. While the structuring element of a binary image is strongly based on the concept of the set theory, that of a gray-level image involves the concept of function rather than set. (s–x) should be included in the domain of f and x should be in the domain of b, which means that f and b overlap.

The dilation is for finding the maximum value among the values existing within the range of the structuring element after adding the value of the structuring element to the value of the original image. By symmetrically moving the structuring element centering the origin, a window operation is performed with respect to the original image. Applying the above definition to two-dimensional image, the following formula (2) can be obtained.

$$(f \oplus b)(s,t) = \max\{f(s-x, t-y)+b(x,y)|(s-x), (t-y) \epsilon D_f \text{ and } (x,y) \epsilon D_b\} \quad (2)$$

An erosion operation is for expanding a dark portion and contracting a bright portion contrary to the dilation operation. The erosion operation is different from the dilation operation in the following aspects.

1) The original structuring element is used as it is without the symmetrical movement thereof with respect to the origin.

2) The value of the structuring element is subtracted from that of the original image.

3) The whole image is darkened by outputting a minimum value.

The definition formula of the dilation with respect to the one-dimensional image is as the following formula (3).

$$(f\ominus b)(s)=\min\{f(s+x)-b(x)|(s+x)\in D_f \text{ and } x\in D_b\} \quad (3)$$

A sign $\ominus$ represents the dilation operation and $D_f$ and $D_b$ represent the domains of the original image and the structuring element, respectively. Applying the formula (3) to the two-dimensional image, the following formula (4) can be obtained.

$$(f\ominus b)(s,t)=\min\{f(s+x, t+y)-b(x,y)|(s+x), (t+y)\in D_f \text{ and } (x,y)\in D_b\} \quad (4)$$

The definition formulas of opening and closing operations are as the following formulas (5) and (6). The opening operation smooths a sharply brightening image portion and the closing operation smooths a sharply darken image portion. The opening and closing operations can be implemented by combining the dilation and erosion operations as the following equations (5) and (6).

$$f \cdot b = (f\ominus b) \oplus b \quad (5)$$

$$f \cdot b = (f\oplus b) \ominus b \quad (6)$$

Next, the VLSI structures for the dilation and erosion operations according to the present invention will be described.

Table 1A shows a 3×3 structuring element, and Table 1B shown an original image. In Tables 1A and 1B, $S_{mn}$ and $I_{ij}$ represent the locations of the structuring element and the original image.

TABLE 1A

| $S_{11}$ | $S_{12}$ | $S_{13}$ |
|---|---|---|
| $S_{21}$ | $S_{22}$ | $S_{23}$ |
| $S_{31}$ | $S_{32}$ | $S_{33}$ |

TABLE 1B

| $I_{11}$ | $I_{12}$ | $I_{13}$ | $I_{14}$ | $I_{15}$ | ... |
|---|---|---|---|---|---|
| $I_{21}$ | $I_{22}$ | $I_{23}$ | $I_{24}$ | $I_{25}$ | ... |
| $I_{31}$ | $I_{32}$ | $I_{33}$ | $I_{34}$ | $I_{35}$ | ... |
| $I_{41}$ | $I_{42}$ | $I_{43}$ | $I_{44}$ | $I_{45}$ | ... |
| $I_{51}$ | $I_{52}$ | $I_{53}$ | $I_{54}$ | $I_{55}$ | ... |
| ... | ... | ... | ... | ... | ... |

For the dilation operation, the structuring element should be symmetrical with respect to the origin. The symmetrical structuring elements with respect to the origin slide within the original image to add the value of the structuring element to that of the original image, thereby calculating the maximum value within the structuring element window. The maximum value is a result of the dilation of the structuring element with respect to the pixel corresponding to the origin. This can be expressed as the following formula (7).

$$I\oplus S=\max\{I_{11}+S_{33}, I_{12}+S_{32}, I_{13}+S_{31}, I_{21}+S_{23}, I_{22}+S_{22}, I_{23}+S_{21}, I_{31}+S_{13}, I_{32}+S_{12}, I_{33}+S_{11}\} \quad (7)$$

The dilation operation includes the addition and comparison operations, so that a hardware architecture therefor is comprised of adders and comparators. Thus, the hardware architecture for the dilation operation can be attained by using less hardware, that is, by sharing common hardware. An intermediate value of the operation should be stored for sharing the hardware, so that a feedback loop is required.

FIG. 1 is a block diagram showing the VLSI structure of hardware architectures for the dilation operation according to the present invention. In FIG. 1, blocks including a sign "+" represent adders, blocks including a sign ">" represent comparators and blocks without any sign represent stores such as registers (The meaning of each block is the same in the following drawings).

A first adder 111 adds a signal of the structuring elements $S_{31}$, $S_{32}$ and $S_{33}$ to an original image input 1 to output the result, a second adder 112 adds a signal of the structuring elements $S_{21}$, $S_{22}$ and $S_{23}$ to an original image input 2 to output the result, and a third adder 113 adds a signal of the structuring elements $S_{11}$, $S_{12}$ and $S_{13}$ to an original image input 3 to output the result. The structuring element $S_{mn}$ input to the adder is appropriately selected according to the input of the original image signal.

Stores 121, 122 and 123 temporarily store the outputs from the adders, comparators 131, 132 and 141 compares two input signals to selectively output a larger value. A store 151 performs comparison three times by feeding back the output data to the comparator 132 and is then reset prior to the next comparison. That is, a new comparison operation is performed every three times. Also, a store 161 loads the data obtained through three comparisons to output a final output.

According to the present invention, the amount of hardware can be decreased by using a feedback loop as described above. That is, the final comparator 141 feedbacks the output via the store 151, so that there is no need for additionally storing an intermediate value of the operation.

Table 2 shows the sequence of the original image signal input to the hardware architectures for the dilation operation shown in FIG. 1. In Table 2, "a" represents the input sequence of the original image input 1, "b" represents the input sequence of the original image input 2 and "c" represents the input sequence of the original image input 3. The hardware architecture for the dilation operation forms one output in units of three inputs with respect to the input of the original image signal.

TABLE 2

| a | $I_{11}$ | $I_{12}$ | $I_{13}$ | $I_{12}$ | $I_{13}$ | $I_{14}$ | ... | $I_{21}$ | $I_{22}$ | $I_{23}$ |
|---|---|---|---|---|---|---|---|---|---|---|
| b | $I_{21}$ | $I_{22}$ | $I_{23}$ | $I_{22}$ | $I_{23}$ | $I_{24}$ | ... | $I_{31}$ | $I_{32}$ | $I_{33}$ |
| c | $I_{31}$ | $I_{32}$ | $I_{33}$ | $I_{32}$ | $I_{33}$ | $I_{34}$ | ... | $I_{41}$ | $I_{42}$ | $I_{43}$ |

According to the first preferred embodiment, an input image signal is input in units of three columns/rows, so that a total of three cycles is required for comparing nine pixels. After clearing the store of the output end every three cycles, the operation with respect to the next window is performed. Even though the size of the structuring element is increased in geometrical progression to 4×4 or 5×5, one more adder and comparator are required, so that an amount of the hardware is decreased.

Figure 2:
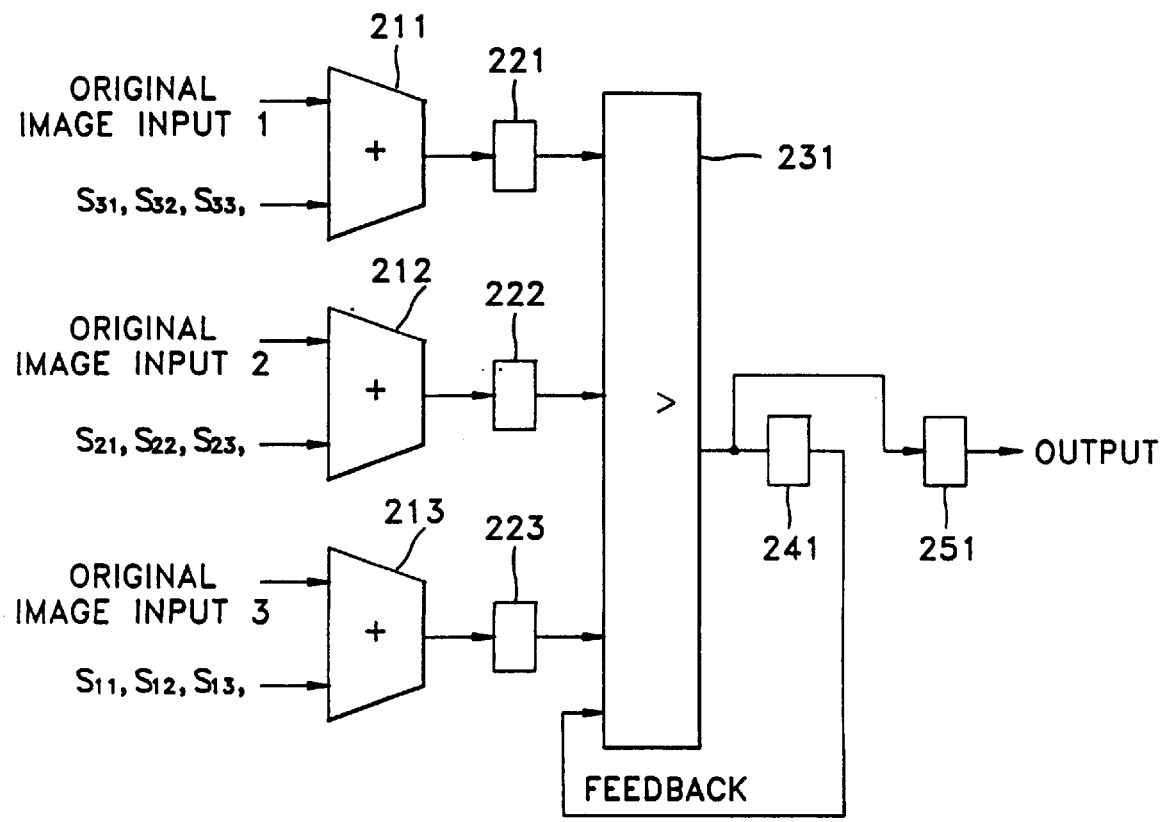
FIG. 2 is a block diagram showing the structure of another hardware architecture for the dilation operation for a 3×3 structuring element according to the present invention.

FIG. 2 is a block diagram showing the structure of other hardware architectures for the dilation operation for a 3×3 structuring element shown in FIG. 1. According to the second preferred embodiment, the hardware architectures includes adders 211, 212 and 213, and stores 221, 222, 223, 241 and 251. However, according to the structure of the comparator, the output signals from the adders and a feedback signal is compared by a comparator having a plurality of inputs instead of two inputs to output the maximum value among the result. Thus, the number of gates of the hardware related with the comparator can be decreased.

Figure 3:
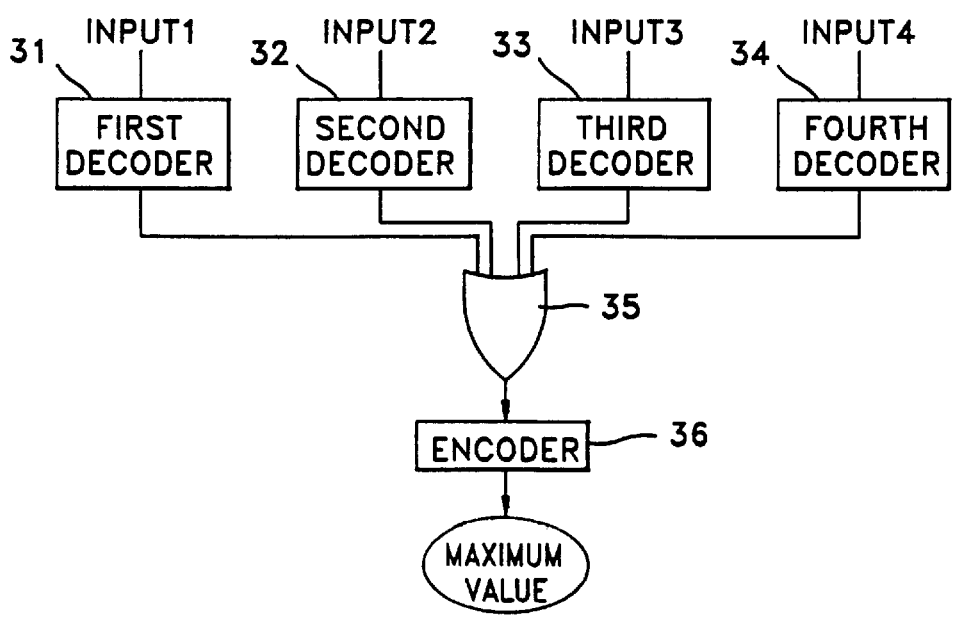
FIG. 3 is a block diagram showing the structure of a comparator used in the hardware architecture for the dilation operation shown in FIG. 1 or 2.

FIG. 3 is a block diagram showing the structure of the comparator used in the hardware architectures for the dilation operation shown in FIG. 1 or 2. Here, a comparator having four inputs is shown.

The comparator decodes each input data using decoders 31, 32, 33 and 34 and performs an OR-operation with respect to each bit of the decoded signals using an OR gate 35. Then, the result is encoded by an encoder 36 to output the maximum value among the input signals.

Table 3 illustrates encoding and decoding methods by the decoders and encoder shown in FIG. 3. The decoder codes performs a coding operation from left to right and the encoder performs a coding operating in the direction opposite to the decoding.

TABLE 3

| 1 | 1 | 1 | 1 | 1 | 1 |
|---|---|---|---|---|---|
| 1 | 0 | 0 | 1 | 1 | 1 |
| 0 | 1 | 0 | 0 | 1 | 1 |
| 0 | 0 | 0 | 0 | 0 | 1 |

Figure 4:
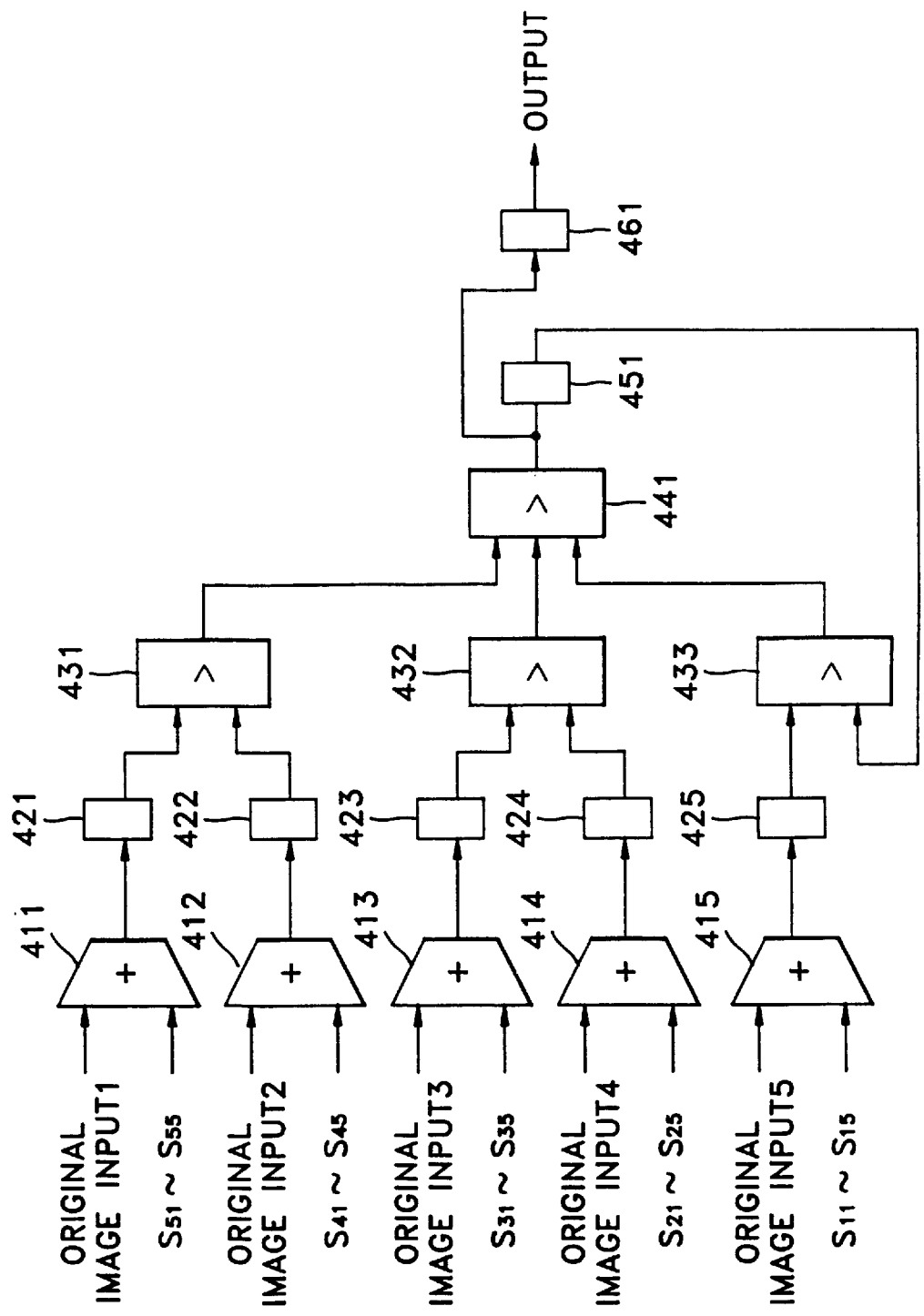
FIG. 4 is a block diagram showing the structure of a hardware architecture for a dilation operation for 5×5 structuring elements according to the present invention.

FIG. 4 is a block diagram showing the structure of the hardware architectures for the dilation operation for a 5×5 structuring element.

A first adder 411 adds one of the structuring elements $S_{51}$ to $S_{55}$ to an original image input 1 to output the result, a second adder 412 adds one of the structuring elements $S_{41}$ to $S_{45}$ to an original image input 2 to output the result, a third adder 413 adds one of the structuring elements $S_{31}$ to $S_{35}$ to an original image input 3 to output the result, a fourth adder 414 adds one of the structuring elements $S_{21}$ to $S_{25}$ to an original image input 4 to output the result, and a fifth adder 415 adds one of the structuring elements $S_{11}$ to $S_{15}$ to an original image input 5 to output the result, respectively. The structuring element $S_{mn}$ input to the adder is appropriately selected according to the input of the original image signal.

Stores 421 to 425 temporarily store the outputs of the adders, and comparators 431, 432, 433 and 441 compare two input signals to selectively output a larger value. The store 451 performs comparison five times by feeding back the output data to the comparator 433 and is then reset prior to the next comparison. That is, a new comparison operation is performed every five times. Also, a store 461 loads the data obtained through five comparisons to output a final output.

In the hardware architecture for the dilation operation for a 5×5 structuring element shown in FIG. 4, the comparators 431, 432, 433 and 441 for comparison with respect to two input signals may be constructed as a comparator having a plurality of inputs, which compares the output signals from the adders with a feedback signal to output the maximum value. As a result, the number of gates of the hardware in the comparator can be decreased, which can be understood easily referring to the hardware architecture for the dilation operation shown in FIGS. 1 and 2.

In the erosion operation, the minimum value within a window of the structuring element is obtained after subtracting the value of the structuring element from that of the original image. Here, the structuring element is not symmetrical with respect to the origin and the minimum value is obtained instead of the maximum value unlike the dilation operation. A formula for the erosion is as the following formula (8).

$$I \ominus S = \min\{I_{11} - S_{11}, I_{12} - S_{12}, I_{13} - S_{13}, I_{21} - S_{21}, I_{22} - S_{22}, I_{23} - S_{23}, I_{31} - S_{31}, I_{32} - S_{32}, I_{33} - S_{33}\} \quad (8)$$

The erosion operation can be changed into the dilation operation by the formula (8) to share the hardware architecture for the erosion with one for the dilation. The formula (9) is obtained by converting the definition formula for the erosion operation into a formula for the dilation operation. If using the formula (9), the comparator and the adders can be shared with the hardware architectures for the dilation operation, so that the erosion operation can be performed by that for the hardware architectures for the dilation operation.

$$(f \ominus b)(s) = -((-f) \oplus b)(s) = -\max\{-f(s-x) + b(x) | (s-x) \in D_f \text{ and } x \in D_b\} \quad (9)$$

Thus, the hardware architectures for the erosion operation (not shown) may be constructed by replacing the adder of the hardware architectures for the dilation operations with a subtractor and adopting a comparator which outputs a minimum value, not the maximum value, with respect to the input signal. Here, the input of the structuring element is not symmetrical with respect to the origin. This structure can be understood easily with reference to FIGS. 1 to 4.

Figure 5:
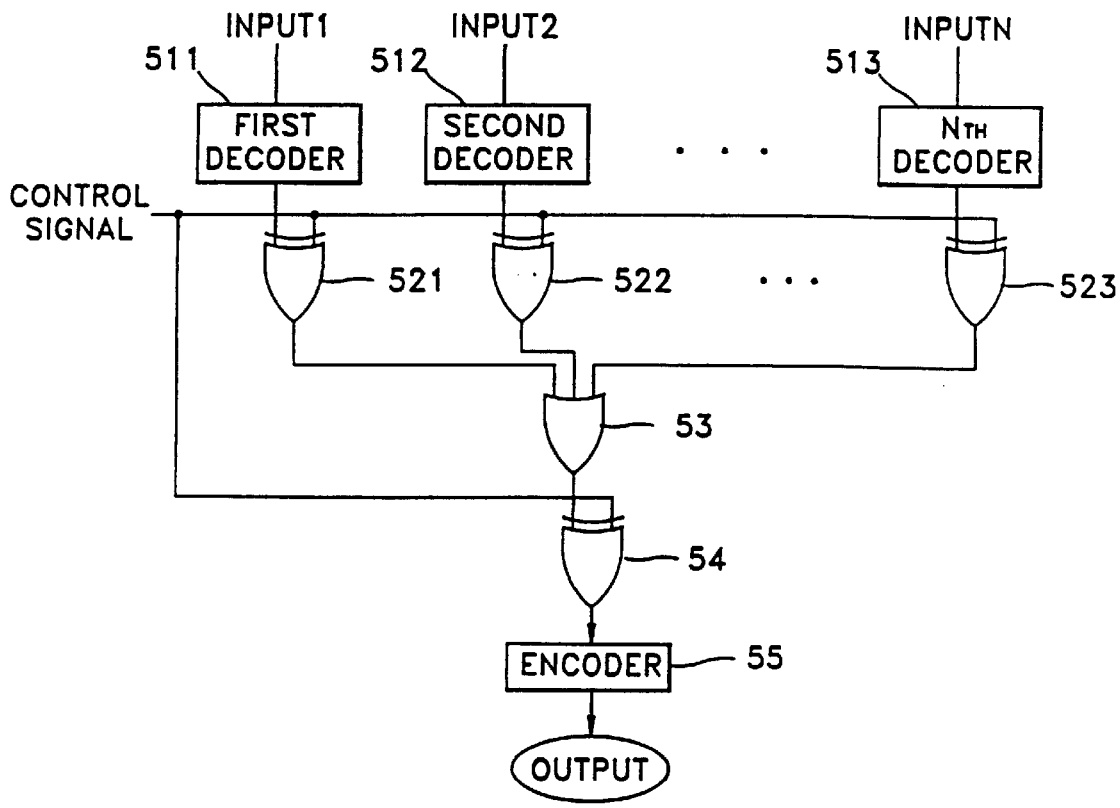
FIG. 5 is a block diagram showing the structure of a comparator to be used in a hardware architecture for dilation and erosion operations according to the present invention.

FIG. 5 is a block diagram showing the structure of a comparator to be used in hardware architectures (not shown) for the image dilation and erosion operations according to the present invention. Here, decoders and an encoder used in this embodiment have functions described in Table 3.

The comparator shown in FIG. 5 further includes a plurality of gates for an exclusive OR operation (XOR) compared with the comparator shown in FIG. 3. A control signal input to an input port of the XOR gate is a logic signal provided according to the dilation/erosion operation, and logic "0" and "1" control signals are input for the dilation and erosion operations, respectively.

That is, each input data is decoded by decoders 511, 512 and 513 and the data is input to the XOR gates 521, 522 and 523 together with the control signal. The XOR gates 521, 522 and 523 output the signals input from the decoders as they are since the control signal is a logic "0" for the dilation operation, and invertly output the signals input from the decoders since the control signal is a logic "1" for the erosion operation. Then, each bit of the signals output from the XOR gates are OR-operated by the OR gate 53 and then input to an XOR gate 54. The XOR gate 54 outputs the input signal as it is for the dilation operation and invertly outputs the input signal for the erosion signal. The output value of the XOR gate 54 is encoded by an encoder 55 and the maximum value and the minimum value among the input signals are output for the dilation and erosion operations, respectively.

Figure 6:
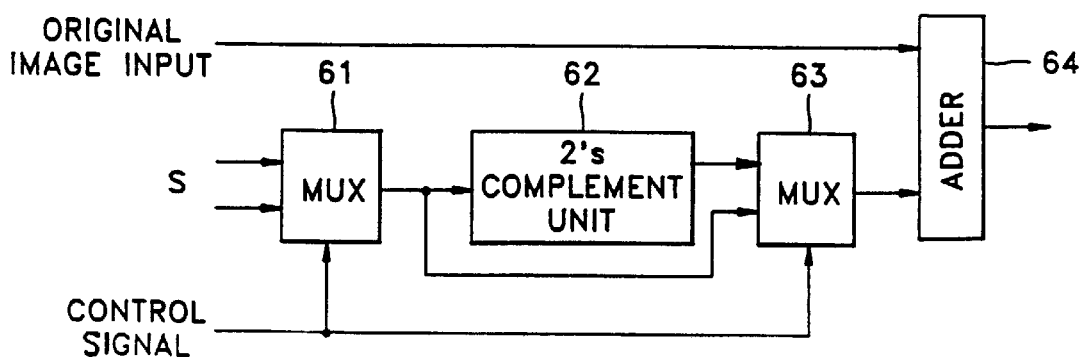
FIG. 6 is a block diagram showing the structure of a subtractor or an adder to be used in the hardware architecture for dilation and erosion operations according to the present invention.
Figure 7:
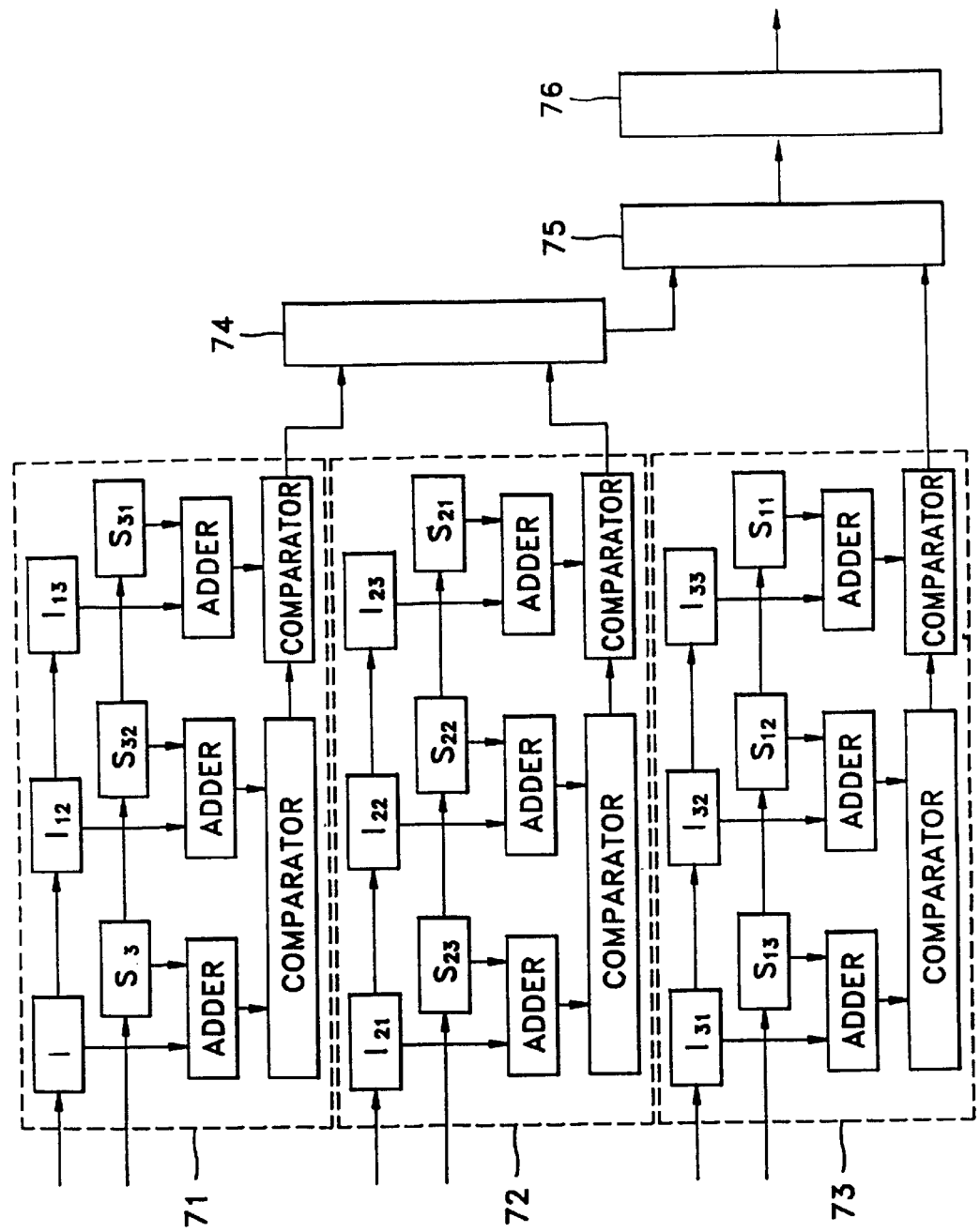
FIG. 7 is a block diagram showing the structure of a conventional hardware architecture for a dilation operation.
Figure 8:
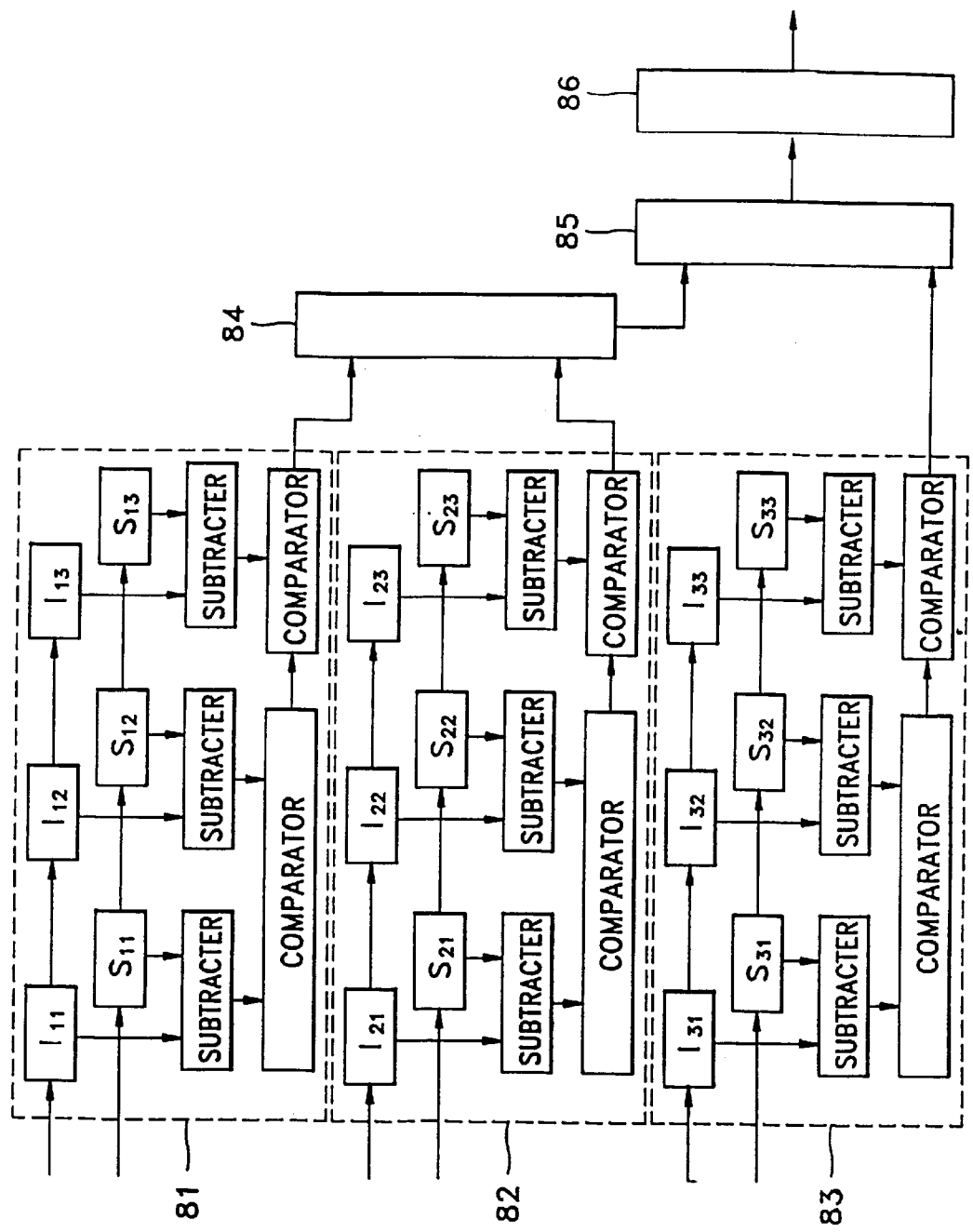
FIG. 8 is a block diagram showing the structure of a conventional hardware architecture for an erosion operation.

FIG. 6 is a block diagram showing the structure of a subtractor or an adder to be used in the hardware architectures for the dilation and erosion operations according to the present invention. In order to simultaneously perform the dilation and erosion operations by one hardware architecture, a subtractor or an adder is required for the addition or subtraction according to the dilation or erosion operation.

The hardware architectures shown in FIG. 6 correspond to an adder shown in FIGS. 1, 2 and 4. If the adder shown in FIGS. 1, 2 and 4 is replaced by the subtractor or adder shown in FIG. 6 and the comparator shown in FIGS. 1, 2 and 4 is replaced by the comparator shown in FIG. 5, the hardware architectures for the dilation and erosion operations according to the present invention can be obtained.

In FIG. 6, a first multiplexer (MUX) 61 selects structuring element data suitable for the operation according to the control signal, a 2's complement unit 62 selects the 2's complement with respect to the input data, and a second MUX 63 selectively outputs one of outputs of the first MUX 61 and the 2's complement unit 62 according to the control signal. Also, an adder 64 adds the output from the second MUX 63 to the original image input. Also, the control signal as a signal provided according to the dilation or erosion operation controls the first and second MUXs 61 and 63.

Here, the first MUX 61 selects the structuring element to be symmetrical with respect to the origin for the dilation operation and the structuring element as it is without being symmetrical with respect to the origin for the erosion operation. Also, the second MUX 63 outputs the structuring element as it is for the dilation operation and the 2's complement of the structuring element for the erosion operation. Thus, the adder 64 outputs a value obtained by adding the structuring element symmetrical to the original image input with respect to the origin and the original image input for the dilation operation and a value obtained by subtracting the value of the structuring element symmetrical to the original image input with respect to the origin from that of the original image input for the erosion operation.

The structure of the hardware architectures for the image dilation and erosion operations according to the present invention can be understood easily with reference to the structures of the hardware architecture for the dilation operation shown in FIG. 1, 2 or 4, the comparator shown in FIG. 5 and the adder or subtractor shown in FIG. 6, and the above description thereof.

According to the present invention, the elementary operations such as dilation and erosion with respect to a gray-level image signal can be attained by a simple arithmetic operation, that is, by finding the maximum/minimum value using an adder. Also, the operation can be performed regardless of the value of the structuring element. Also, since the hardware architectures for the dilation and erosion operations adopts a feedback structure, the volume of the hardware linearly increases even though the size of the structuring element increases in geometric progression.

What is claimed is:

1. A hardware architecture for a dilation operation, comprising:

a plurality of adding means for receiving a plurality of pixel data of an image signal, for receiving a plurality of structuring element data, wherein each of said structuring element data corresponds to one of the pixel data, and for adding the pixel data to the corresponding structuring element data to output an added result;

a plurality of storing means for storing the added results from said plurality of adding means;

comparing means for receiving the added results from each of said plurality of storing means, for receiving an intermediate feedback data during the dilation operation, and for comparing the added results from each of the plurality of storing means with each other and with the intermediate feedback data to create a maximum data until each of the plurality of added results from each of the storing means have been compared; and outputting means for feeding back the maximum data from said comparing means as the intermediate feedback data to the comparing means, and, after the dilation operation is completed, for outputting the maximum data.

2. A hardware architecture for a dilation operation of an image signal as claimed in claim 1, wherein said comparing means comprises:

a plurality of decoding means corresponding to the number of the input data, for setting digital data having a plurality of bits into a logic high, from the least significant bit of the digital data to a bit corresponding to a value of the input data, thereby decoding the input data to the digital data;

OR-operating means for OR-operating the digital data output from said decoding means by each bit data; and encoding means for outputting data in accordance with the number of bits having logic high values among the data output from said OR-operating means, wherein the output data refers to the maximum value among the data input to the comparing means.

3. A hardware architecture for an erosion operation, comprising:

a plurality of subtracting means for receiving a plurality of pixel data of an image signal, for receiving a plurality of structuring element data, wherein each of said structuring element data corresponds to one of the pixel data, and for subtracting the pixel data to the corresponding structuring element data to output a subtracted result;

a plurality of storing means for storing the subtracted results from said plurality of subtracting means;

comparing means for receiving, the subtracted results from each of said plurality of storing means, for receiving an intermediate feedback data during the erosion operation, and for comparing the subtracted results from each of the plurality of storing means with each other and with the intermediate feedback data to create a minimum data until each of the plurality of subtracted results from each of the storing means have been compared; and outputting means for feeding back the minimum data from said comparing means as the intermediate feedback data to the comparing means, and, after the erosion operation is completed, for outputting the minimum data obtained after the last subtracted result has been compared with the intermediate feedback data.

4. A hardware architecture for an erosion operation of an image signal as claimed in claim 3, wherein said comparing means comprises:

a plurality of decoding means corresponding to the number of the input data, for setting digital data having a plurality of bits into a logic high, from the least significant bit of the digital data to a bit corresponding to a value of the input data, thereby decoding the input data to the digital data;

AND-operating means for AND-operating the digital data output from said decoding means by each bit data; and encoding means for outputting data in accordance with the number of bits having logic high values among the data output from said AND-operating means, wherein the output data refers to the minimum value among the data input to the comparing means.

5. A hardware architecture for dilation and erosion operations, comprising:

control signal generating means for generating a control signal determining whether to perform either dilation or erosion operation with respect to said image signal;

a plurality of operating means for receiving a plurality of pixel data of an image signal, for receiving a plurality of structuring element data, wherein each of said structuring element data corresponds to one of the pixel data, and for adding the pixel data to the corresponding structuring element data to output an added result if the dilation operation is selected by the control signal or for subtracting the structuring element data from the pixel data to output a subtracted result if the erosion operation is selected by the control signal;

a plurality of storing means for temporarily storing the added results or subtracted results from said plurality of operating means;

comparing means for receiving the added results or subtracted results from each of said plurality of storing means, for receiving an intermediate feedback data during the dilation and erosion operations, and for comparing the added results or subtracted results from each of the plurality of storing means with each other and with the intermediate feedback data to create a maximum data thereamong if the dilation operation is selected by the control signal or the minimum data thereamong if the erosion operation is selected by the control signal until each of the plurality of added results or subtracted results from each of the storing means have been compared; and outputting means for feeding back the maximum data or minimum data from said comparing means as the intermediate feedback data to the comparing means, and, after the dilation and erosion operations are completed, for outputting the maximum data or minimum data.

6. A hardware architecture for dilation and erosion operations of an image signal as claimed in claim 5, wherein said operating means comprises:

first multiplexer means for selectively outputting one of said structuring elements according to said control signal;

2's complement operating means for generating a 2's complement with respect to the output signal of said first multiplexer means;

second multiplexer means for selectively outputting one of the output signals of said first multiplexer or said 2's complement operating means according to said control signal; and an adder for adding the output signal of said second multiplexer means to said image signal.

7. A hardware architecture for dilation and erosion operations of an image signal as claimed in claim 5, wherein said comparing means comprises:

a plurality of decoding means corresponding to the number of the input data, for setting digital data having a plurality of bits into a logic high, from the least significant bit of the digital data to a bit corresponding to a value of the input data, thereby decoding the input data to the digital data;

a plurality of first exclusive OR-operating means for performing an exclusive OR-operation between each output signal of said decoding means and said control signal to pass the output signal of said decoding means if dilation operation is selected by the control signal or invert the output signal of said decoding means if erosion operation is selected by the control signal;

OR-operating means for OR-operating all output signals of said first exclusive OR-operating means by bit;

second exclusive OR-operating means for performing the exclusive OR-operation between the output signal of said OR-operating means and said control signal to pass the output signal of said OR-operating means if dilation operation is selected by the control signal or invert the output signal of said OR-operating means if erosion operation is selected by the control signal; and encoding means for outputting data in accordance with the number of bits having logic high values among the data output from said second exclusive OR-operating means, wherein the output data refers to the maximum value among the data input to said comparing means if dilation operation is selected by the control signal or the minimum value among the data input to said comparing means if erosion operation is selected by the control signal.

* * * * *